(12) United States Patent
Graham et al.

(10) Patent No.: US 7,010,202 B1
(45) Date of Patent: Mar. 7, 2006

(54) VARIABLE FIELD OF VIEW OPTICAL SYSTEM

(75) Inventors: Amy G. Graham, Orlando, FL (US); Max Amon, Maitland, FL (US); Richard A. Leblanc, Clermont, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 127 days.

(21) Appl. No.: 10/664,394

(22) Filed: Sep. 16, 2003

(51) Int. Cl.
  *G02B 6/42* (2006.01)
  *G02B 3/00* (2006.01)

(52) U.S. Cl. .................. 385/119; 359/648; 359/653

(58) Field of Classification Search .......... 385/116, 385/119–1; 359/664, 642, 364, 648, 652–654, 359/726–850
  See application file for complete search history.

(56) References Cited

U.S. PATENT DOCUMENTS

| | | | | |
|---|---|---|---|---|
| 5,822,091 A | * | 10/1998 | Baker | .......... 359/10 |
| 5,940,222 A | * | 8/1999 | Sinclair et al. | .......... 359/689 |
| 6,039,447 A | * | 3/2000 | Minato | .......... 351/216 |
| 6,108,135 A | * | 8/2000 | Ho | .......... 359/654 |
| 6,118,578 A | * | 9/2000 | Hall | .......... 359/356 |
| 2002/0096629 A1 | * | 7/2002 | Korein | .......... 250/227.11 |

OTHER PUBLICATIONS

Mukherjee, S. P., Lowdermilk, W. H., Gradient-index AR film deposited by teh Sol-gel process, Jan. 15, 1982, Applied Optics, vol. 21, No. 2, pp293-296.*

Hikmet, R. A. M., "In situ observation of ion concentration profiles in lithium ion-conducting gels", *Solid State Ionics*, Jan., 2000, pp. 199-205, vol. 127.

* cited by examiner

*Primary Examiner*—Frank G. Font
*Assistant Examiner*—Erin D. Chiem
(74) *Attorney, Agent, or Firm*—Jeffrey D. Myers; Peacock Myers, P.C.

(57) ABSTRACT

A variable field of view optical system and method comprising providing a forward curved optical element, providing a rearward optical element comprising an axially gradient index material, providing a curved focal surface, and conveying an image on the curved focal surface to a flat detector surface.

25 Claims, 2 Drawing Sheets

VARIABLE FIELD OF VIEW OPTICAL SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to methods and apparatuses for variable field of view optical systems.

2. Description of Related Art

In imaging applications, a wide view of the surroundings (with low resolution) is needed to find areas of interest, while a narrow field of view with high resolution is required to investigate the details of these high-interest areas. Advanced biological imaging systems resolve this dilemma with a high-resolution central area and a lower resolution periphery. The high-resolution area is optimized for accurate imaging, and controls the intensity and focus of the overall system. The periphery is optimized to detect motion, and places a low burden on the processing.

A host of issues prevent manmade systems from completely duplicating the biological approach. Biological imaging systems are usually based on spherical imagers (eyeballs) while manmade systems are typically planar (CCDs). This also limits the size of a manmade imager, since optical devices, even manmade, work best with spherical focal planes, and must be compensated for flat focal planes. While the density of detectors in biological systems varies from the center to the edges, manmade imagers have a uniform population of detector elements.

The present invention mimics the features of nature's designs, with concomitant benefits to both commercial and military applications. For example, every defense system that requires optical imaging is limited by the capability of the imaging system. The adaptive optics of the invention enhance the versatility of these systems by allowing the system resolution to increase or decrease as necessary, while maintaining a simultaneous wide and narrow field of view. Elimination of moving parts in these systems also enable a more compact optical system.

BRIEF SUMMARY OF THE INVENTION

The present invention is of a variable field of view optical system and method comprising: providing a forward curved optical element; providing a rearward optical element comprising an axially gradient index material; providing a curved focal surface; and conveying an image on the curved focal surface to a flat detector surface. In the preferred embodiment, the forward curved optical element comprises a ball lens. Conveying may comprise employing a backward curving or hollow field relay lens. Conveying may also comprise employing a plurality of optical fibers, preferably wherein the fibers are concentrated more densely in a center of the focal surface than in a periphery of the focal surface and wherein the fibers are mounted normal to the curved focal surface. The rearward optical element comprises a dynamic index material, preferably an electroactive hydrogel. The method provides simultaneous wide field of view with a lower resolution and narrow field of view with higher resolution, and employs substantially no moving parts.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1A:
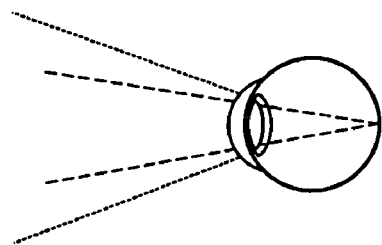
FIG. 1(a) illustrates the human eye and FIG. 1(b) the octopus eye.
Figure 1B:
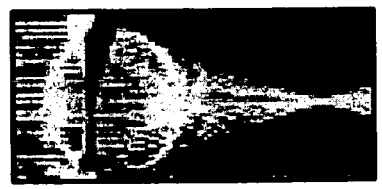

In the human eye the cornea and the lens form the imaging mechanism and are responsible for focusing a clear image onto the retina. The two lenses are both fixed in position. To focus an image on the retina, the interior lens remains stationary, but changes shape. Octopus eyes are similar to those of humans in that each has a lens, iris, pupil, and retina, but no cornea. FIG. 1 outlines the anatomy of the human and octopus eyes. The octopus relies primarily on its vision to survive, with its stereoscopic binocular vision both forward and above, providing an almost $2\pi$ steradian field of view. The octopus changes the position of its lens relative to the retina in order to keep both near and far objects in sharp focus at all times—a definite advantage for an animal that must be constantly searching for nearby food, but still keep an eye on the horizon for possible predators. The present invention mimics this focusing mechanism by dynamically altering the refractive index of the optical element material. The refraction in the octopus eyes is entirely controlled by a the discontinuous spherical lens with a variable refractive index that bends rays and adds power, correcting for spherical aberrations.

This high spherical symmetry reduces monochromatic aberrations and yields a wide field of view. The main drawback of this design is that there exist strong uncorrected longitudinal chromatic aberrations that limit resolution. In the present invention, an index gradient is added to correct for these chromatic aberrations. The preferred embodiment for mimicking the anatomy of the octopus eye utilizes a nearly spherical lens with an axial gradient index material as well as optical fibers to relay the image onto the flat surface of the detector. Preferably an electroactive hydrogel is employed as an optical element to enable dynamic control of refractive index. The location and density of fibers on the curved surface is adjusted to simulate the variable resolution typical of biological imaging systems.

Figure 2:
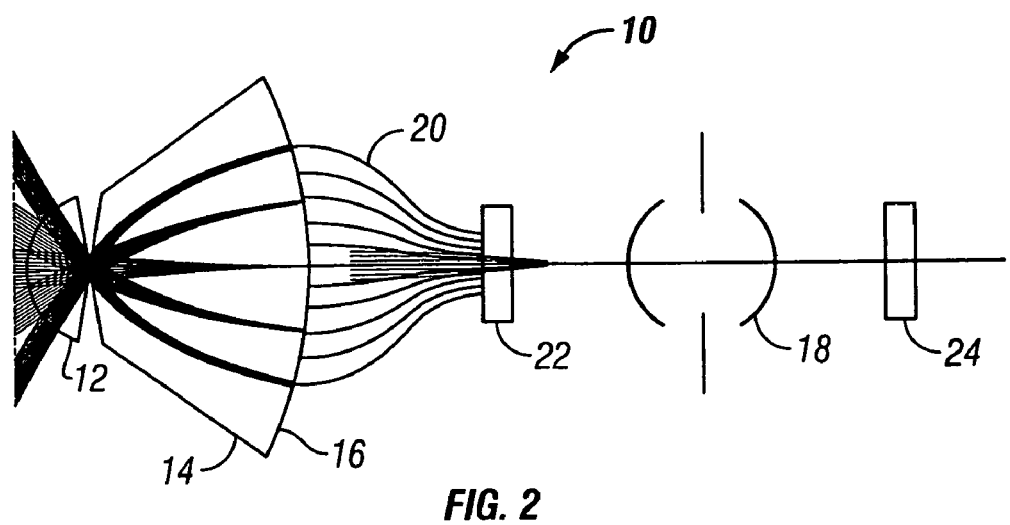
FIG. 2 is a ray trace and fiber imaging outline of an optics design according to the present invention.

The human eye is a prime example of an elegant wide/narrow FOV system. The focal surface or retina is curved. This is typical of focal surfaces as they occur in nature. Manmade systems, on the other hand, typically use flat focal surfaces because of the difficulty and cost of developing film and/or sensors on a curved surface. The radius of the curved surface in the present invention can be different for each application. If one were to design systems with a curved image surface production cost would be significantly higher, and therefore man made systems typically employ a flat image surface. The WFOV of the human eye provides low-resolution peripheral vision (approximately 180 degrees) while it is sharp only at the fovea. Manmade systems that require imaging are typically limited by the capability of the front end, especially the optical configuration, and typical man made lens designs are designed to be in sharp focus out to the edge of the field. Studies of octopus eyes have shown that a gradient index lens material actually corrects the spherical aberration of the system. This yields sharp imagery in the center of the field. The preferred system 10 of the invention is illustrated in FIG. 2.

The present invention preferably comprises a highly-curved optical element 12 (e.g., ball lens or ½ ball lens). The lens is preferably rotationally symmetric about the optical axis and the stop is at the center. Axially gradient index material is used in the rear lens 14 to correct the spherical aberration and axial color. The system as shown covers a 120° FOV and has a curved focal surface 16. The curved focal surface is a problem because typical sensors are flat. To directly relay the image from the back surface of the "ball lens" to the flat detector surface, a backward curving or hollow field relay lens 18 is used.

An alternate approach uses optical fibers 20 to gather the energy and bring it to a flat image surface 22 so that it can either be deposited directly or optically relayed onto the sensor 24. The optical fiber approach allows a variable density across the field by proper spacing the fibers, better approximating the high-resolution center and lower resolution periphery of a biological optical system. For example, 10-micron fibers could be used in the center for high resolution and courser 50 to 100 micron fibers might be used elsewhere in the FOV. The fibers must be mounted or bonded to the image and perpendicular to the surface to minimize losses. Other than the high-resolution/low-resolution zones, physical correlation of detectors and fibers is not critical and could actually be random. After fabrication of the system the image is mapped from object space to image space (point by point) and remapped by computer software. This is preferably done throughout the FOV, though in the center of the FOV a coherent fiber bundle would assure the best resolution possible. Using optical materials that experience a change in index as a result of applying electrical power, near range focus could be accomplished without any moving parts. The example shown here was designed in the visible spectral range using optical glasses. However, the same concept can be extended to the ultraviolet and near, mid, and far infrared.

The curved ray path in the rear lens section is a result of an axial gradient index given by the following equation:

$$N = \Sigma N_{0n} N_n,$$

where: Z is the position along the optical axis;
$N_{00}$=base index of the material at a given wavelength;
$N_{01}$=first gradient coefficient;
$N_{02}$=second gradient coefficient;
$N_{03}$=third gradient coefficient; and
$N_{04}$=fourth gradient coefficient.

The front section is preferably made of a dynamic index material that can be powered to increase the index and provide range focus capability. A different dynamic material can be used in the center area near the stop; this would change the transmitted spectral range so that spectral information can be extracted from the image.

Gradient index material preferably employs an electroactive hydrogel as an optical element to enable dynamic control of its refractive index. The refractive index profile of a hydrogel material containing electrolytes is proportional to the spatial distribution of the ionic components within the gel network. The application of an electric field will lead to a redistribution of the electrolyte concentration and thus, a change in its spatial refractive index profile. This mechanism enables a gradient refractive index (GRIN) element with a dynamically controllable index profile.

Figure 3A:
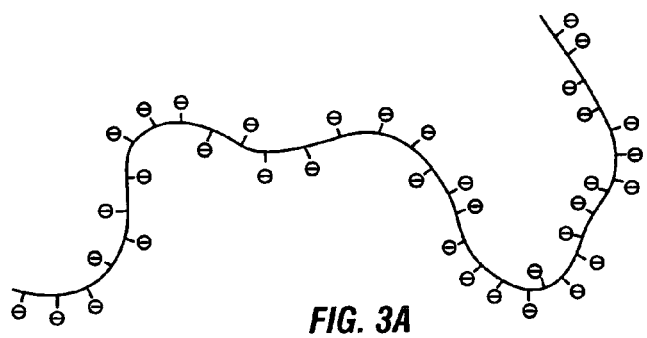
FIG. 3 illustrates a charged polyelectrolyte and hydrogel network embodiment of the invention.
Figure 3B:
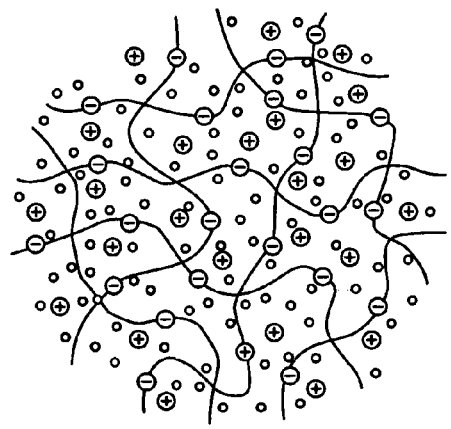

Hydrogel polymers represent one of the most prevalent polymers found in commodity applications. Common applications for hydrogels include super-absorbant materials, contact lenses and cosmetics. Despite this commercial success of hydrogel materials, only recently have there been proposed uses for this material in technical applications. In a charged polyelectrolyte shown schematically in FIG. 3, the polymer chains are linked to one another through cross linking sites and swollen by solvent molecules, such as water that "ionize" the acid or salt groups along the polymer backbone to yield mobile hydrated ions (generally cations) and immobile anions attached to the polymer backbone.

It is the mobility of hydrated ions, afforded by swelling the hydrogel with a suitable solvent, that leads to an electroactive response. In particular, the hydrated cations will tend to move to the negatively charged electrode under the action of electrophoresis. As the refractive index of a solution changes with the concentration of its ionic contents, this electrophoresis motion of the ions in the hydrogel provides the means to address the refractive index profile of the medium.

Figure 4A:
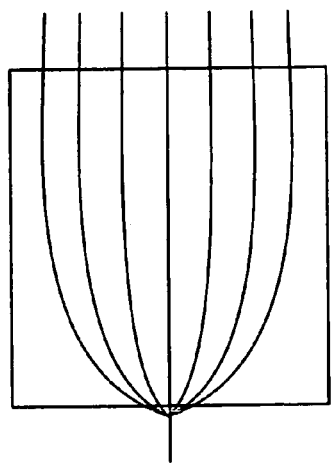
FIG. 4 illustrates a gradient index (GRIN) lens embodiment of the invention (FIG. 4(a)) and a corresponding index profile (FIG. 4(b)).
Figure 4B:
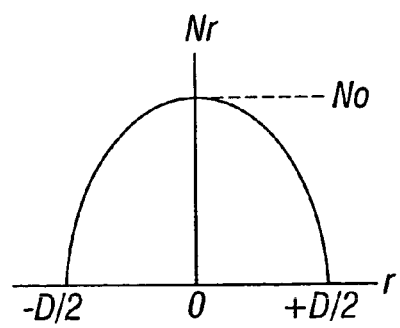

By grading the refractive index of a material throughout a cylindrical lens, light rays can be controllably redirected into the desired configuration, just as if a conventional aspherical lens were encountered. The refractive index is then a function of the radius, with the maximum index at the axis of the lens. This Gradient-Index (GRIN) lens (see R. A. M. Hikmet, *Solid State Ionics*, 127, 199–205 (2000)) embodiment of the invention is illustrated in FIG. 4.

The present invention enhances the versatility of optical systems by enabling simultaneous low resolution WFOV with high resolution NFOV, an imaging capability currently accomplished only by using complicated moving parts. These gradient index elements eliminate the need for moving parts such as zoomed and gimbaled optics, reducing components of these systems. Additionally, the ability to dynamically vary the index of elements of an optical system allows for an even more compact system capable of the same imaging potential as today's most complex optical systems.

With the present invention, the need for zooming optics is eliminated by using a gradient index, near spherical lens to vary the field of view of an optical system while avoiding using any moving parts. A gradient index material is used to focus on a curved surface, and one then maps this surface to a flat detector with a greater density of fibers toward the center of the focal plane. This design allows for high resolution at the center of the focal plane, which decreases toward the edges of the field of view.

Zoom optics requires the user to select between a narrow field of view for high resolution or a wide field of view for observation. Arrays with a variable pixel density is an expensive solution. Using a gradient index material to focus on a curved focal plane and then mapping this surface to a flat uniform detector, with a greater density of fibers toward the center of the focal plane, allows one to simulate a biological eye, increasing the resolution near the center of a detector array with a uniform density of pixels.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A variable field of view optical system comprising:
a forward curved optical element;
a rearward optical element comprising an axially gradient index material;
a curved focal surface; and
means for conveying an image on said curved focal surface to a flat detector surface, wherein said means comprises a plurality of optical fibers, and wherein said fibers are concentrated more densely in a center of said focal surface than in a periphery of said focal surface.

2. The system of claim 1 wherein said forward curved optical element comprises a ½ ball lens.

3. The system of claim 1 wherein said conveying means comprises a backward curving or hollow field relay lens.

4. The system of claim 1 wherein said fibers are mounted normal to said curved focal surface.

5. The system of claim 1 wherein said rearward optical element comprises a dynamic index material.

6. The system of claim 5 wherein said dynamic index material comprises an electroactive hydrogel.

7. The system of claim 1 wherein said system provides simultaneous wide field of view with a lower resolution and narrow field of view with higher resolution.

8. The system of claim 7 wherein said system comprises substantially no moving parts.

9. A variable field of view optical method comprising the steps of:
providing a forward curved optical element;
providing a rearward optical element comprising an axially gradient index material;
providing a curved focal surface; and
conveying an image on the curved focal surface to a flat detector surface with a plurality of optical fibers which are concentrated more densely in a center of the focal surface than in a periphery of the focal surface.

10. The method of claim 9 wherein the forward curved optical element comprises a ½ ball lens.

11. The method of claim 9 wherein conveying comprises employing a backward curving or hollow field relay lens.

12. The method of claim 9 wherein the fibers are mounted normal to the curved focal surface.

13. The method of claim 9 wherein the rearward optical element comprises a dynamic index material.

14. The method of claim 13 wherein the dynamic index material comprises an electroactive hydrogel.

15. The method of claim 9 wherein the method provides simultaneous wide field of view with a lower resolution and narrow field of view with higher resolution.

16. The method of claim 15 wherein the method employs substantially no moving parts.

17. An optical system for conveying an image to an image sensor comprising:
fiber optic cable for conveying images to the image sensor, wherein the fiber optic cable comprises a plurality of optical fibers and said optical fibers are more densely concentrated at the center of the image sensor.

18. The optical system of claim 17 wherein the system further comprises a forward curved optical element.

19. The optical system of claim 18 wherein the forward curved optical element comprises a ½ ball lens.

20. The optical system of claim 18 further comprising a rearward optical element comprising an axially gradient index material.

21. The optical system of claim 17 further comprising a curved focal surface.

22. The optical system of claim 18 wherein the fibers are mounted normal to the curved focal surface.

23. The system of claim 20 wherein said rearward optical element comprises a dynamic index material.

24. The system of claim 23 wherein said dynamic index material comprises an electroactive hydrogel.

25. The system of claim 1 wherein said system provides simultaneous wide field of view with a lower resolution and narrow field of view with higher resolution.

* * * * *